US011642962B2

(12) United States Patent
Lee

(10) Patent No.: US 11,642,962 B2
(45) Date of Patent: May 9, 2023

(54) CENTER INFORMATION DISPLAY SYSTEM, VEHICLE, AND METHOD FOR ADJUSTING VIEW ANGLE OF CENTER INFORMATION DISPLAY

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventor: Chia-Yen Lee, New Taipei (TW)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 302 days.

(21) Appl. No.: 16/916,058

(22) Filed: Jun. 29, 2020

(65) Prior Publication Data
US 2021/0284022 A1 Sep. 16, 2021

(30) Foreign Application Priority Data
Mar. 16, 2020 (CN) .......................... 202010182155.7

(51) Int. Cl.
B60K 35/00 (2006.01)
B60W 50/14 (2020.01)
B60W 60/00 (2020.01)
B60W 40/08 (2012.01)
G06F 3/01 (2006.01)
G06V 20/59 (2022.01)

(52) U.S. Cl.
CPC ............. *B60K 35/00* (2013.01); *B60W 40/08* (2013.01); *B60W 50/14* (2013.01); *B60W 60/005* (2020.02); *G06F 3/011* (2013.01); *G06V 20/593* (2022.01); *B60K 2370/52* (2019.05); *B60W 2050/146* (2013.01); *B60W 2420/403* (2013.01)

(58) Field of Classification Search
CPC ..... B60K 35/00; B60W 60/005; B60W 40/08; B60W 50/14; G60F 3/001
See application file for complete search history.

(56) References Cited

U.S. PATENT DOCUMENTS 8,784,206 B1 * 7/2014 Gronkowski ....... G07F 17/3211
463/32
11,351,892 B1 * 6/2022 Roy ......................... B60N 2/10
2003/0202005 A1 * 10/2003 Sadahiro ............ H04N 21/4122
715/716

(Continued)

FOREIGN PATENT DOCUMENTS

CN 101044547 A 9/2007
CN 108749732 A 11/2018

*Primary Examiner* — Hoi C Lau
(74) *Attorney, Agent, or Firm* — ScienBiziP, P.C.

(57) ABSTRACT

A center information display system includes a center information display; a capturing device configured to obtain information on an occupant inside a vehicle; a rotating structure configured to adjust a view angle of the center information display; and a control device in communication with the capturing device, being configured to determine whether there is an occupant in a driver seat or a passenger seat, and control the rotating structure to rotate the center information display to a predetermined view angle.

14 Claims, 4 Drawing Sheets

(56) References Cited

U.S. PATENT DOCUMENTS

| | | | | |
|---|---|---|---|---|
| 2007/0008094 A1* | 1/2007 | Schedivy | ............ | B60R 11/0235 |
| | | | | 340/472 |
| 2009/0096811 A1* | 4/2009 | Tanaka | .................. | G02F 1/1313 |
| | | | | 248/176.1 |
| 2009/0284474 A1* | 11/2009 | Komaki | ........... | G08G 1/096883 |
| | | | | 345/1.3 |
| 2014/0226276 A1* | 8/2014 | Sung | ..................... | G06F 1/1681 |
| | | | | 361/679.27 |
| 2015/0138043 A1* | 5/2015 | Rawlinson | ............... | B60N 2/22 |
| | | | | 345/2.2 |
| 2018/0052494 A1* | 2/2018 | Coburn | .................. | B60N 2/002 |
| 2019/0375514 A1* | 12/2019 | Lampazzi | ................ | G09G 5/38 |
| 2020/0278745 A1* | 9/2020 | Jung | ....................... | G06F 3/013 |
| 2020/0391669 A1* | 12/2020 | Fontaeus | ................ | B60R 11/02 |
| 2021/0039562 A1* | 2/2021 | Jablonski | ............... | H02K 7/003 |
| 2021/0063783 A1* | 3/2021 | Byoun | ................ | G02F 1/1323 |
| 2021/0284022 A1* | 9/2021 | Lee | ..................... | G06V 20/593 |
| 2021/0364810 A1* | 11/2021 | Kim | .................. | G02B 27/0179 |

* cited by examiner

CENTER INFORMATION DISPLAY SYSTEM, VEHICLE, AND METHOD FOR ADJUSTING VIEW ANGLE OF CENTER INFORMATION DISPLAY

FIELD

The subject matter herein generally relates to a center information display system, a vehicle, and a method for controlling a center information display.

BACKGROUND

A center information display in a vehicle (e.g., a car) is generally arranged in the center of the central console, which can provide functions such as navigation, audio-visual entertainment, mobile phone link, and vehicle control for the driver and passengers. The main user of the center information display in the vehicle is the driver, while a passenger in the passenger seat can also carry out auxiliary operation. The orientation of the center information display generally includes facing towards the driver or being perpendicular to a central axis of the vehicle.

Facing towards the driver can provide a more convenient way for the driver to view or operate the center information display. However, it is not comfortable for passengers in the passenger seats to view or operate the center information display. Perpendicular to a central axis of the vehicle is more comfortable for the passengers to view or operate the vehicle. However, it is not convenient for the driver to view or operate the center information display, especially during driving.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to provide a clear understanding of the objects, features, and advantages of the present disclosure, the same are given with reference to the drawings and specific embodiments. It should be noted that non-conflicting embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art as generally understood. The terms used in the present disclosure are for the purposes of describing particular embodiments and are not intended to limit the present disclosure.

The term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In the description of embodiments of the invention, "a plurality of" means two or more, unless otherwise specifically defined.

The terms "top", "bottom", "perpendicular", "parallel", "upper", "lower", "inside", "outside", and other indicating directions or positions are based on the directions or positions shown in the attached drawings In order to facilitate the description of the embodiment and simplify the description of the invention, rather than indicating or implying that the device or element referred to must have a specific orientation, be constructed and operated in a specific orientation, it cannot be understood as a limitation of the embodiment of the invention.

Figure 1:
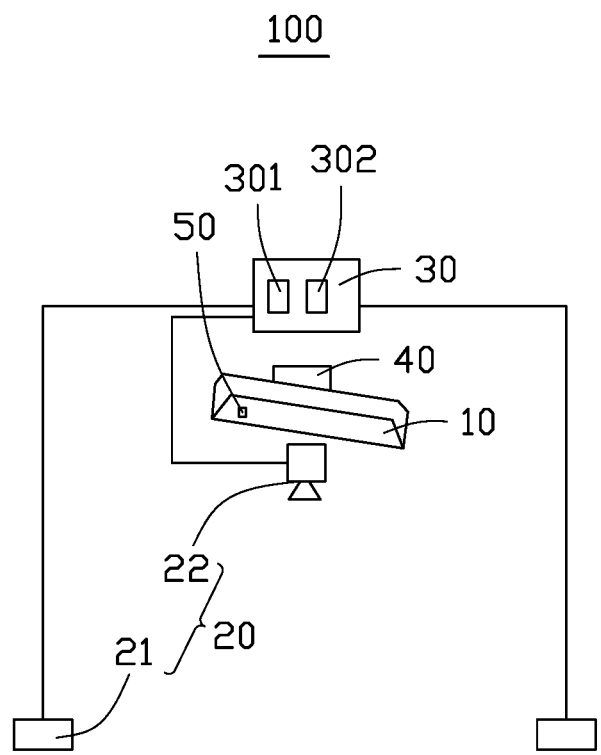
FIG. 1 illustrates a schematic structural diagram of a center information display system according to an embodiment of the present disclosure.
Figure 2:
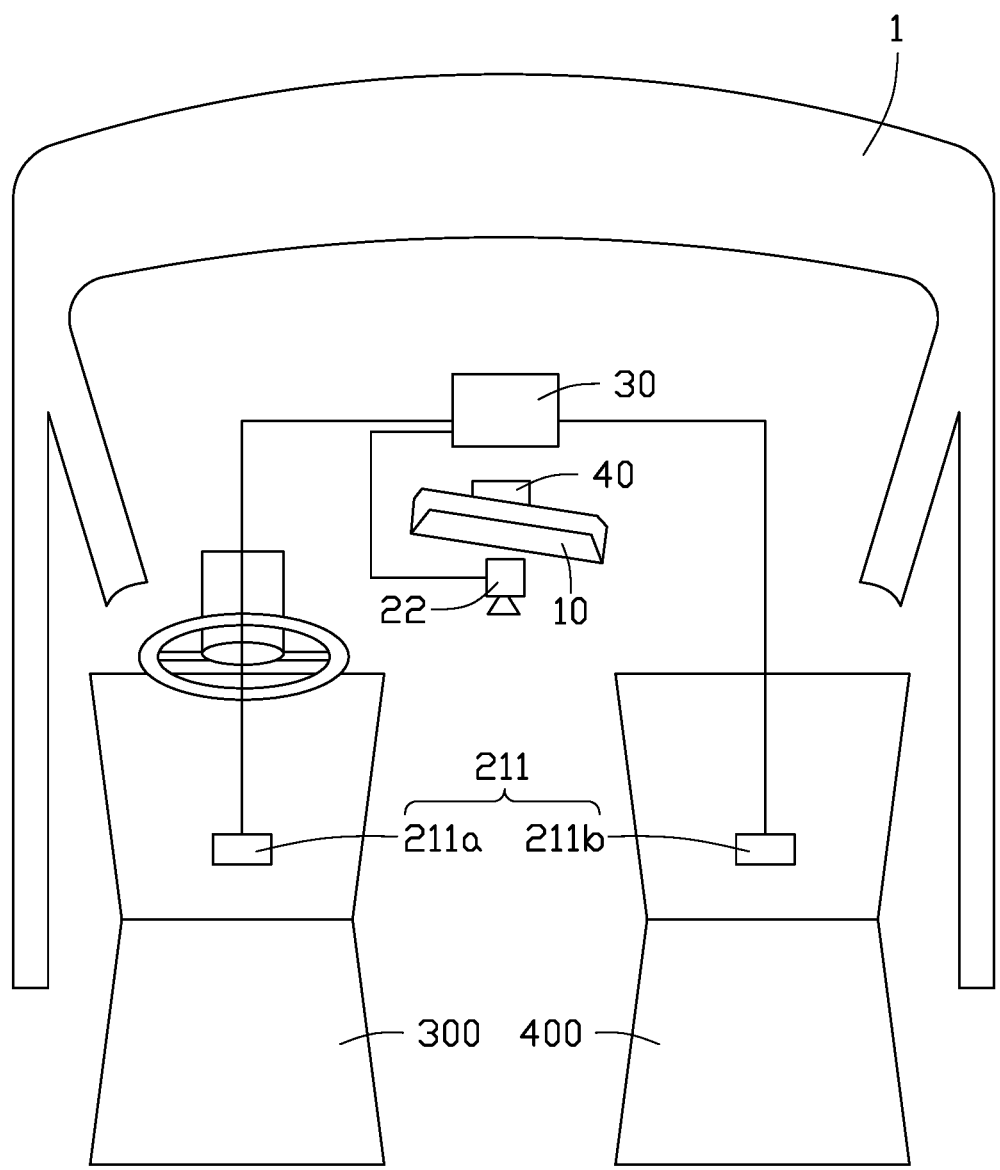
FIG. 2 illustrates an application environment of the center information display system according to an embodiment of the present disclosure.

Referring to FIGS. 1 and 2, a center information display system 100 includes a center information display 10, a capturing device 20, a control device 30, and a rotating structure 40. The control device 30 is in communication with the capturing device 20 and the rotating structure 40. The center information display 10 is connected with the rotating structure 40.

The capturing device 20 is configured to obtain information on occupants inside a vehicle. The control device 30 is configured to determine whether there is an occupant in each vehicle seat based on the information on occupants and control the rotating structure 40 to rotate the center information display 10 to a predetermined view angle.

In at least one embodiment, the capturing device 20 can be a camera which can capture an image of the occupants inside the vehicle. The control device 30 determines whether there is an occupant in the driver seat or in the passenger seat based on the image of the occupants. If there is only an occupant in the driver seat, the control device 30 controls the rotating structure 40 to rotate the center information display 10 towards the driver. If there is only an occupant in the passenger seat, the control device 30 controls the rotating structure 40 to rotate the center information display 10 towards the passenger seat. If there are occupants both in the driver seat and in the passenger seat, the control device 30 controls the rotating structure 40 to rotate the center information display 10 to be perpendicular to a central axis of the vehicle.

In at least one embodiment, the capturing device 20 can be a sensor 21 which can detect the information on the occupants or the vehicle seat based on which the control device 30 can determine whether there is an occupant in each vehicle seat. In at least one embodiment, the sensor 21 can be a pressure sensor, a temperature sensor, an infrared sensor, or a voice sensor. For example, if the sensor 21 is a pressure sensor 211, the pressure sensor 211 can be arranged on the vehicle seat to detect pressure on the vehicle seat. When an occupant seats on the vehicle seat, the pressure sensor 211 can detect a change of the pressure on the vehicle seat. The control device 30 can determine that there is an occupant in the vehicle seat based on the change of the pressure on the vehicle seat. If the control device 30 determines that there is an occupant in the driver seat but no occupant in the passenger seat, the control device 30 controls the rotating structure 40 to rotate the center information display 10 towards the driver; if the control device 30 determines that there is an occupant in the passenger seat but no occupant in the driver seat, the control device 30 controls the rotating structure 40 to rotate the center information display 10 towards the passenger seat; if the control device 30 determines that there are occupants in both the driver seat and the passenger seat, the control device 30 controls the rotating structure 40 to rotate the center information display 10 to be perpendicular to the central axis of the vehicle.

In at least one embodiment, in order to more accurately determine whether there is an occupant in a vehicle seat, the capture device 20 can be a combination of the sensor 21 and a camera 22. Only when a determining result based on information captured by the sensor 21 is same with a determining result based on information captured by the camera 22, the control device 30 controls the rotating structure 40 to rotate the center information display 10.

In at least one embodiment, the center information display system 100 further includes a switch module 50 configured to allow a user to switch the center information display system 100 between an automatic model and a manual model. In the automatic model, the control device 30 controls the rotating structure 40 to rotate the center information display 10; while in the manual model, the orientation of the center information display 10 is controlled by the user himself. In at least one embodiment, the switch module 50 can include a key which can be operated to perform switching between the automatic model and the manual model. In at least one embodiment, the switch module 50 can include an on-screen key or an icon displayed in a user interface which can be operated to perform switching between the automatic model and the manual model.

In at least one embodiment, a method for controlling the center information display 10 may include: the control device 30 obtains the information on the occupants inside the vehicle from the capturing device 20; the control device 30 determines whether there is an occupant in the driver seat or the passenger seat; the control device 30 controls the rotating structure 40 to rotate the center information display 10 to the predetermined view angle based on said determining. If there is only an occupant in the driver seat, the control device 30 controls the rotating structure 40 to rotate the center information display 10 towards the driver. If there is only an occupant in the passenger seat, the control device 30 controls the rotating structure 40 to rotate the center information display 10 towards the passenger seat. If there are occupants both in the driver seat and in the passenger seat, the control device 30 controls the rotating structure 40 to rotate the center information display 10 to be perpendicular to the central axis of the vehicle.

In at least one embodiment, the control device 30 is further configured to determine whether a current orientation of the center information display 10 is corresponding to the determining result. If the current orientation of the center information display 10 is corresponding to the determining result, the control device 30 does not control the rotating structure 40 to rotate the center information display 10. If the current orientation of the center information display 10 is not corresponding to the determining result, the control device 30 controls the rotating structure 40 to rotate the center information display 10. For example, if the determining result is that there is only an occupant in the driver seat, the current orientation of the center information display 10 is towards the driver, the control device 30 does not control the rotating structure 40 to rotate the center information display 10. If the determining result is that there is only an occupant in the driver seat, the current orientation of the center information display 10 is perpendicular to the central axis of the vehicle, the control device 30 controls the rotating structure 40 to rotate the center information display 10 towards the driver.

Figure 3:
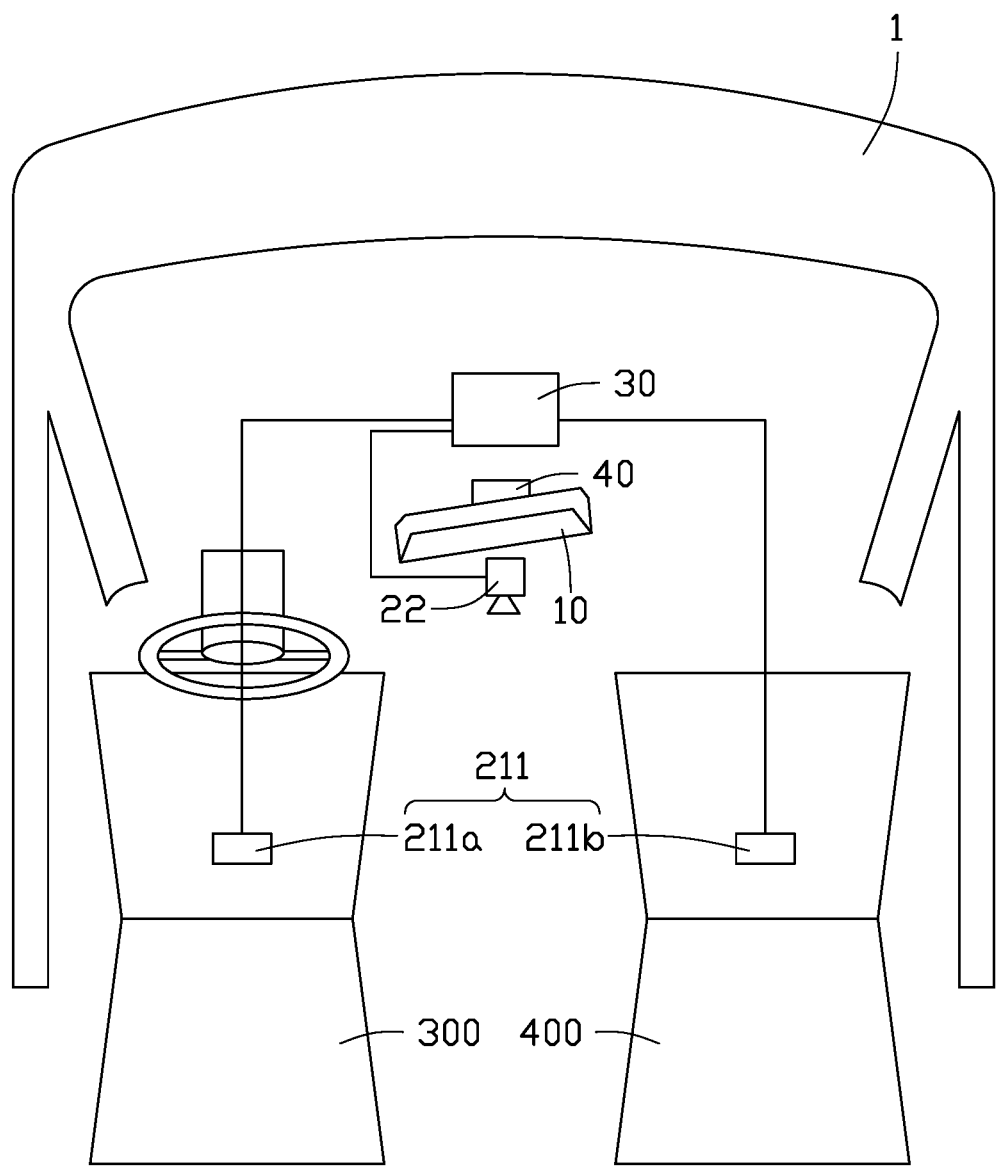
FIG. 3 shows a schematic diagram of which the center information display faces a driver according to an embodiment of the present disclosure.
Figure 4:
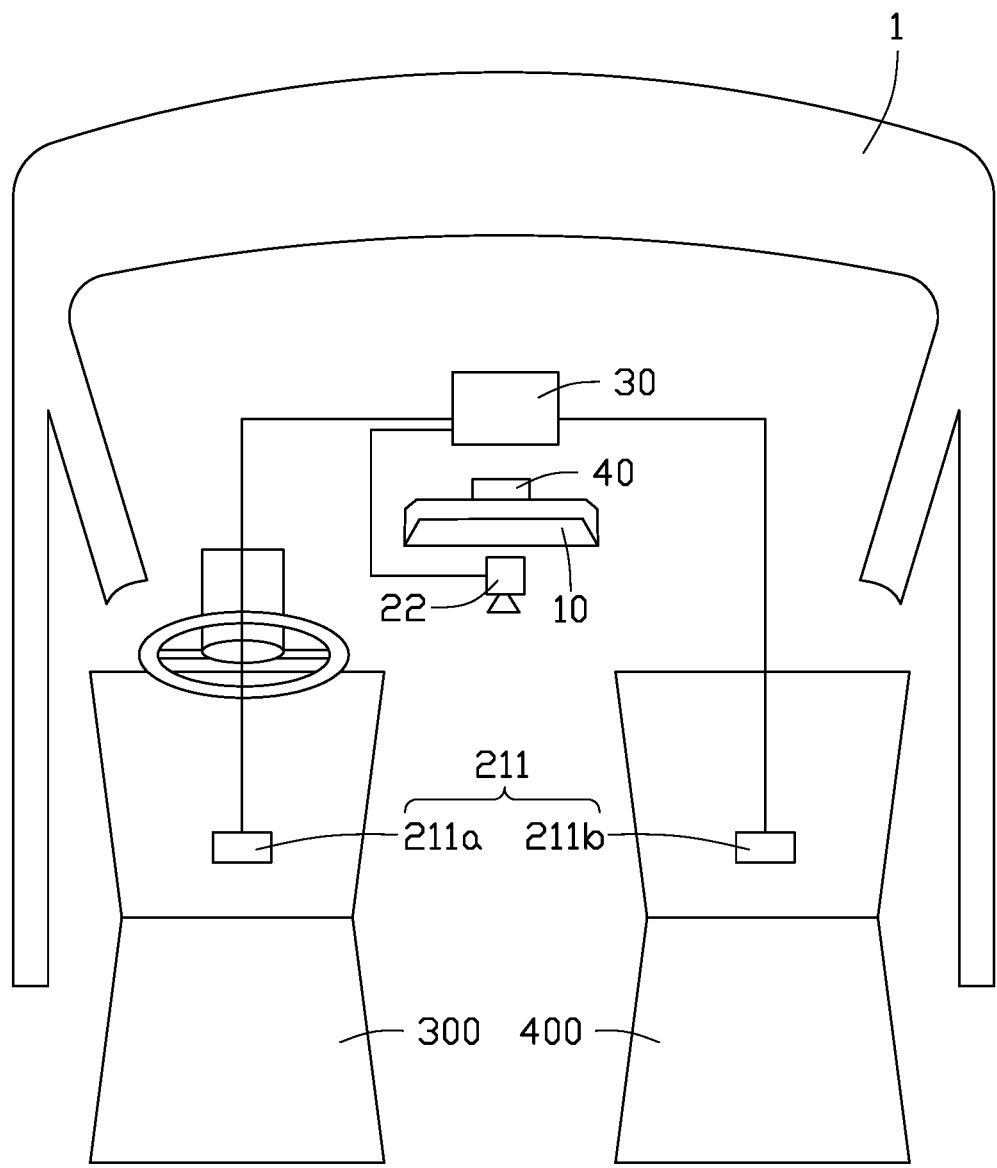
FIG. 4 shows a schematic diagram of which the center information display is perpendicular to a central axis of a vehicle according to an embodiment of the present disclosure.

Referring to FIGS. 2-4, a vehicle 1 including the center information display system 100 is illustrated. The vehicle 1 includes a driver seat 300 and a passenger seat 400. The pressure sensor 211 can include a first pressure sensor 211*a* and a second pressure sensor 211*b*. The first pressure sensor 211*a* is arranged on the driver seat 300, the second pressure sensor 211*b* is arranged on the passenger seat 400. The camera 22 can be arranged on a central control panel of the vehicle 1.

Referring to FIG. 2, when there is only an occupant in the driver seat 300, the first pressure sensor 211*a* detects a change of pressure on the driver seat 300, the camera 22 takes an image of the occupant, the control device 30 determines whether there is an occupant in the driver seat 300 or in the passenger seat 400 based on the change of pressure and the image taken by the camera 22. If the control device 30 determines there is an occupant in the driver seat 300 based on the change of pressure, and determines there is an occupant in the driver seat 300 based on the image, the control device 30 controls the rotating structure 40 to rotate the center information display 10 towards the driver.

Referring to FIG. 3, when there is only an occupant in the passenger seat 400, the second pressure sensor 211*b* detects a change of pressure on the passenger seat 400, the camera 22 takes an image of the occupant, the control device 30 determines whether there is an occupant in the driver seat 300 or in the passenger seat 400 based on the change of pressure and the image taken by the camera 22. If the control device 30 determines there is an occupant in the passenger seat 400 based on the change of pressure, and determines there is an occupant in the passenger seat 400 based on the image, the control device 30 controls the rotating structure 40 to rotate the center information display 10 towards the passenger seat.

Referring to FIG. 4, when there are occupants both in the driver seat 300 and in the passenger seat 400, the first pressure sensor 211*a* and the second pressure sensor 211*b* detect changes of pressure on the driver seat 300 and the passenger seat 400, the camera 22 takes an image of the occupants, the control device 30 determines whether there is an occupant in the driver seat 300 or in the passenger seat 400 based on the changes of pressure and the image taken by the camera 22. If the control device 30 determines there are occupants both in the driver seat 300 and in the passenger seat 400 based on the changes of pressure, and determines there are occupants both in the driver seat 300 and in the passenger seat 400 based on the image, the control device 30 controls the rotating structure 40 to rotate the center information display 10 to be perpendicular to the central axis of the vehicle.

In at least one embodiment, the method further includes switching between the automatic model and the manual model based on a user input. In at least one embodiment, the user input can be a key input, a touch operation on an on-screen key, a click on an icon, a predetermined gesture, or a voice command. The method further includes determining which one of the automatic model and the manual model is the current model. If the current model is the automatic model, the control device 30 controls the rotating structure 40 to rotate the center information display 10 based on the information obtained from the capturing device 20.

The center information display system 100 and the method controlling the center information display 10 can adjust a view angle of the center information display 10 based on the information obtained from the capturing device 20. This way can be more convenient for the occupants inside the vehicle to view or operate the center information display 10.

Referring back to FIG. 1, in at least one embodiment, the control device 30 can be a computer device, including a storage device 301 and at least one processor 302. In other examples the control device 30 may include more or less components than those illustrated, or combine some components, or different components. For example, the control device 30 may further include an input/output device, a network access device, a bus, and the like.

In some embodiments, the storage device 301 can be used to store program codes of computer readable programs and various data. The storage device 301 can include a read-only memory (ROM), a random access memory (RAM), a programmable read-only memory (PROM), an erasable programmable read only memory (EPROM), a one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the processor 302.

In some embodiments, the at least one processor 302 may be a central processing unit (CPU), and may also include other general-purpose processors, digital signal processors (DSPs), application specific integrated circuits (ASICs), and off-the-shelf programmable gate arrays, Field-Programmable Gate Array (FPGA), or other programmable logic device, discrete gate, or transistor logic device, discrete hardware components, etc. The general-purpose processor may be a microprocessor or the processor may be any conventional processor or the like. The at least one processor 302 can be a control center of the vehicle 1, and connects sections of the entire vehicle 1 with various interfaces and lines.

The computer readable programs can be stored in a computer readable storage medium if implemented in the form of a software functional unit and sold or used as a stand-alone product. The present disclosure implements all or part of the processes in the foregoing embodiments, and a computer program may also instruct related hardware. The computer program may be stored in a computer readable storage medium. The steps of the various method embodiments described above may be implemented by a computer program when executed by a processor. Wherein, the computer program comprises computer program code, which may be in the form of source code, product code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunications signals, and software distribution media. It should be noted that the content contained in the computer readable medium may be increased or decreased according to the requirements of legislation and patent practice in a jurisdiction, for example, in some jurisdictions, computer-readable media does not include electrical carrier signals and telecommunication signals.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:
1. A center information display system, comprising:
a center information display;
a capturing device configured to obtain information of occupancies inside a vehicle, the capturing device comprising a camera and two sensors, the two sensors respectively arranged on a driver seat and a passenger seat of the vehicle;
a rotating structure configured to adjust a view angle of the center information display; and
a control device in communication with the capturing device and the rotating structure, the control device being configured to determine if each of the driver seat and the passenger seat is occupied, and control the rotating structure to rotate the center information display to a predetermined view angle,
wherein the control device is in communication with each of the camera and the two sensors, the camera is configured to capture images inside the vehicle, the two sensors are configured to detect a change of pressure on each of the driver seat and the passenger seat, when the control device determined that a result based on the change of pressure detected by the two sensors matches a result based on the images captured by the camera, the control device controls the rotating structure to rotate the center information display to the predetermined view angle, and
wherein when the control device determines that only the driver seat is occupied, the control device controls the rotating structure to rotate the center information display towards the driver seat; and when the control device determined that only the passenger seat is occupied, the control device controls the rotating structure to rotate the center information display towards the passenger seat; and when the control device determines that both the driver seat and the passenger seat are occupied, the control device controls the rotating structure to rotate the center information display to be perpendicular to a central axis of the vehicle.

2. The center information display system according to claim 1, wherein the two sensors are selected from pressure sensors, temperature sensors, infrared sensors, and voice sensors.

3. The center information display system according to claim 1, further comprising: a switching module configured to switch the center information display system between an automatic model and a manual model, the switching module being in communication with the center information display.

4. The center information display system according to claim 3, wherein the switching module includes a key or a screen key or an icon on a screen.

5. A vehicle, comprising:
a driver seat;
a passenger seat; and
a center information display system, comprising:
   a center information display;
   a capturing device configured to obtain information of occupancies inside the vehicle, the capturing device comprising a camera and two sensors, the two sensors respectively arranged on the driver seat and the passenger seat of the vehicle;
   a rotating structure configured to adjust a view angle of the center information display;
   a control device in communication with the capturing device and the rotating structure, the control device being configured to determine if each of the driver seat and the passenger seat is occupied, and control the rotating structure to rotate the center information display to a predetermined view angle,
   wherein the control device is in communication with each of the camera and the two sensors, the camera is configured to capture images inside the vehicle, the two sensors are configured to detect a change of pressure on each of the driver seat and the passenger seat, when the control device determined that a result based on the change of pressure detected by the two sensors matches a result based on the images captured by the camera, the control device controls the rotating structure to rotate the center information display to the predetermined view angle, and
   wherein when the control device determines that only the driver seat is occupied, the control device is configured to control the rotating structure to rotate the center information display towards the driver seat; and when the control device determined that only the passenger seat is occupied, the control device is configured to control the rotating structure to rotate the center information display towards the passenger seat; and when the control device determines that both the driver seat and the passenger seat are occupied, the control device is configured to control the rotating structure to rotate the center information display to be perpendicular to a central axis of the vehicle.

6. The vehicle according to claim 5, wherein the two sensors are selected from pressure sensors, temperature sensors, infrared sensors, and voice sensors.

7. The vehicle according to claim 5, wherein the center information display system further comprises: a switching module configured to switch the center information display system between an automatic model and a manual model, the switching module is in communication with the center information display.

8. The vehicle according to claim 7, wherein the switching module includes a key or a screen key or an icon on a screen.

9. A method for adjusting a view angle of a center information display, the method comprising:
obtaining information of occupancies inside a vehicle by capturing images inside the vehicle, and detecting a change of pressure on each of a driver seat and a passenger seat;
determining whether an occupant is in the driver seat and/or the passenger seat by matching the captured images with the detected change of pressure on each of the driver seat or the passenger seat; and
controlling a rotating structure to rotate the center information display to a predetermined view angle,
wherein when only the driver seat is occupied is determined, controlling the rotating structure to rotate the center information display towards the driver seat; when only the passenger seat is occupied is determined, controlling the rotating structure to rotate the center information display towards the passenger seat; and when both the driver seat and the passenger seat are occupied is determined, controlling the rotating structure to rotate the center information display to be perpendicular to a central axis of the vehicle.

10. The method according to claim 9, further comprising:
determining whether a current orientation of the center information display is towards the driver seat, if only the driver seat is occupied is determined;
controlling the rotating structure to rotate the center information display towards the driver seat, if the current orientation of the center information display is not towards the driver seat.

11. The method according to claim 9, further comprising:
determining whether a current orientation of the center information display is towards the passenger seat, if only the passenger seat is occupied is determined;
controlling the rotating structure to rotate the center information display towards the driver seat, if the current orientation of the center information display is not towards the passenger seat.

12. The method according to claim 9, further comprising:
determining whether a current orientation of the center information display is perpendicular to a central axis of the vehicle, if both the driver seat and the passenger seat are occupied is determined;
controlling the rotating structure to rotate the center information display to become perpendicular to the central axis of the vehicle, if the current orientation of the center information display is not perpendicular to the central axis of the vehicle.

13. The method according to claim 9, further comprising:
switching from one of an automatic model and a manual model to the other one of the automatic model and the manual model based on a user input.

14. The method according to claim 13, wherein the user input is received from a key or a screen key or an icon on a screen.

* * * * *